US007675522B2

(12) United States Patent
Kubota et al.

(10) Patent No.: US 7,675,522 B2
(45) Date of Patent: Mar. 9, 2010

(54) VIDEO SIGNAL PROCESSING CIRCUIT, CONTROL METHOD OF VIDEO SIGNAL PROCESSING CIRCUIT, AND INTEGRATED CIRCUIT

(75) Inventors: Masahiro Kubota, Ikoma (JP); Hideki Mine, Katano (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 923 days.

(21) Appl. No.: 10/563,020

(22) PCT Filed: Jul. 2, 2004

(86) PCT No.: PCT/JP2004/009771

§ 371 (c)(1), (2), (4) Date: Jun. 29, 2006

(87) PCT Pub. No.: WO2005/004103

PCT Pub. Date: Jan. 13, 2005

(65) Prior Publication Data

US 2007/0103456 A1 May 10, 2007

(30) Foreign Application Priority Data

Jul. 4, 2003 (JP) ............................ 2003-192385

(51) Int. Cl.

| | |
|---|---|
| ***G06F 13/372*** | (2006.01) |
| ***G06F 13/18*** | (2006.01) |
| ***G09G 5/39*** | (2006.01) |
| ***G06F 3/038*** | (2006.01) |
| ***G09G 1/06*** | (2006.01) |

(52) U.S. Cl. ...................... 345/534; 345/531; 345/535; 345/29; 345/213

(58) Field of Classification Search ................ 345/531, 345/534, 535, 545, 560, 29, 213
See application file for complete search history.

(56) References Cited

U.S. PATENT DOCUMENTS 6,734,863 B1 * 5/2004 Ikeda ........................ 345/531

FOREIGN PATENT DOCUMENTS

| | | |
|---|---|---|
| JP | 2000-330520 | 11/2000 |
| JP | 2003-288202 | 10/2003 |
| WO | 00/03381 | 1/2000 |

* cited by examiner

*Primary Examiner*—Hau H Nguyen
(74) *Attorney, Agent, or Firm*—Oblon, Spivak, McClelland, Maier & Neustadt, L.L.P.

(57) ABSTRACT

A display error occurs upon contention between writing of pixel data in a GRAM and reading of pixel data representing a scanning line including pixels which correspond to the pixel data above. Pixel data corresponding to pixels representing a scanning line stored in a latch circuit is displayed on a display panel, and when contention occurs between writing of pixel data in a GRAM and reading of pixel data corresponding to pixels representing a scanning line to the latch circuit from the GRAM, a controller delays reading of the pixel data corresponding to the pixels representing the scanning line and controls so as to perform reading of the pixel data corresponding to the pixels representing the scanning line to the latch circuit from the GRAM once again.

5 Claims, 9 Drawing Sheets

VIDEO SIGNAL PROCESSING CIRCUIT, CONTROL METHOD OF VIDEO SIGNAL PROCESSING CIRCUIT, AND INTEGRATED CIRCUIT

FIELD OF THE INVENTION

The present invention relates to a video signal processing circuit which processes a video signal displayed on a display screen, a control method for video signal processing circuit which is for controlling a video signal processing circuit, and an integrated circuit.

BACKGROUND OF ART

A liquid crystal display apparatus for use in mobile telephone terminal or the like uses, for the purpose of displaying a video signal, a video processing circuit which processes a video signal by digital signal processing (See Japanese Patent Application Laid-Open Gazette No. 2000-330520 for instance). FIG. 4 shows a conventional video processing circuit 13 which is used in a mobile telephone terminal.

The video processing circuit 13 comprises a latch circuit 3 and a GRAM (graphics Random access memory) 2. The GRAM 2 is a readable/writable memory which stores pixel data amounting to one screen displayed by a display panel 8, and in this memory, pixel data corresponding to one pixel which forms the display panel 8 is written in synchronization to a memory clock signal 12 which is input.

The latch circuit 3 is a circuit which reads from the GRAM 2 pixel data equivalent to one scanning line displayed by the display panel 8 and which stores the same.

An operation of such a conventional video processing circuit 13 will now be described.

A data latch signal 10 is input to the latch circuit 3. Meanwhile, a display read control signal 9 and the memory clock signal 12 are input to the GRAM 2.

FIG. 5 is a timing chart of these various types of drive signals and the control signal to the video processing circuit 13.

In the timing chart in FIG. 5, the display read control signal 9 shown in FIG. 4 is shown as a display read control signal 51, the data latch signal 10 shown in FIG. 4 is shown as a data latch signal 52, and the memory clock signal 12 shown in FIG. 4 is shown as a memory clock signal 53. Further, in FIG. 5, display data 54 and display data 55 are output data from the GRAM 2 corresponding to the bits of memory elements which form the GRAM 2, of which the display data 54 is data output from the GRAM 2 corresponding to a bit of a memory element forming the GRAM 2 when this bit is set to the L-state from the H-state while the display data 55 is data output from the GRAM 2 corresponding to a bit of a memory element forming the GRAM 2 when this bit is set to the H-state from the L-state. At each bit of the memory elements forming the GRAM 2, one bit of pixel data to be displayed is stored.

The display read control signal 51 is a control signal which can be in the H (High)-state which is indicative of a discharge period and the L (Low)-state which is indicative of a memory update period. When the display read control signal 51 fed to the GRAM 2 is in the H-state, that is, the discharge period, all of display data from the GRAM 2 is in the L-state regardless of whether the bits of the memory elements which form the GRAM 2 corresponding to this display data are in the L-state or the H-state. When the display read control signal 51 fed to the GRAM 2 is in the L-state, that is, the memory update period, the latch circuit 3 reads from the GRAM 2 pixel data equivalent to one scanning line and stores the same.

However, the display data output from the GRAM 2, once set to the H-state during the memory update period, remains in the H-state during the memory update period independently of the values of the bits of the memory elements which form the GRAM 2. The display data output from the GRAM 2 can return to the L-state only after the display read control signal 51 has switched to the H-state, that is, the discharge period. In other words, the display data output from the GRAM 2 enters the L-state as soon as the display read control signal 51 switches to the H-state, even without the L-state written at the bits of the memory elements which form the GRAM 2. This is the characteristic of display data output from the GRAM 2.

Further, when the data latch signal 52 is fed to the latch circuit 3, the latch circuit 3 finalizes the values of the bits of memory elements which form the latch circuit 3 in response to falling of the data latch signal 52.

Further, when pixel data are written in the GRAM 2, the memory clock signal 53 is fed to the GRAM 2 and the memory clock signal 53 falls. In this manner, the pixel data are written in the GRAM 2 in synchronization to the memory clock signal 53.

Writing of the pixel data in the GRAM 2 takes place independently of reading of pixel data equivalent to one scanning line from the GRAM 2 to the latch circuit 3.

This operation is summarized as follows.

That is, while the display read control signal 51 remains in the H-state, the display data output from the GRAM 2 becomes the L-state. Upon inputting of the memory clock signal to the GRAM 2, the pixel data is written in the GRAM 2 at falling of the memory clock signal.

As the display read control signal 51 changes to the L-state from the H-state, i.e., as the display read control signal 51 enters the memory update period, the latch circuit 3 reads the pixel data equivalent to one scanning line stored in the GRAM 2 into the respective memory elements which form the latch circuit 3 and stores the pixel data in the respective memory elements.

After inputting of the data latch signal 52 to the latch circuit 3, the latch circuit 3 finalizes the pixel data equivalent to one scanning line read and stored into the memory elements when the data latch signal 52 falls.

When display data output from the GRAM 2 is updated to the L-state from the H-state as in the case of the display data 54 for example, the latch circuit 3 sets the corresponding memory elements of the latch circuit 3 to the L-state in response to falling of the data latch signal 52.

On the contrary, when display data output from the GRAM 2 is updated to the H-state from the L-state as in the case of the display data 55 for example, the latch circuit 3 sets the corresponding memory elements of the latch circuit 3 to the H-state in response to falling of the data latch signal 52.

SUMMARY OF THE INVENTION

FIG. 6 is a different timing chart from that in FIG. 5, showing the various types of drive signals and the control signal to the video processing circuit 13.

In the timing chart in FIG. 6, the display read control signal 9 shown in FIG. 4 is shown as a display read control signal 56, the data latch signal 10 shown in FIG. 4 is shown as a data latch signal 57, and the memory clock signal 12 shown in FIG. 4 is shown as a memory clock signal 58. Further, in FIG. 6, display data 59 and display data 60 are output data from the GRAM 2 corresponding to the bits of the memory elements which form the GRAM 2, the bits of the memory elements of the GRAM 2 corresponding to the display data 59 are set to the L-state from the H-state, and the bits of the memory elements of the GRAM 2 corresponding to the display data 60 are set to the H-state from the L-state.

A difference between the timing chart in FIG. 5 referred to in relation to the conventional technique and the timing chart in FIG. 6 is that the memory clock signal 58 is fed while the display read control signal 56 stays in the L-state, that is, the memory update period in the timing chart in FIG. 6.

Further, pixels for pixel data which is written in the GRAM 2 at falling of the memory clock signal 58 after inputting of the memory clock signal 58 are among those pixels which are for pixel data representing a horizontal scanning line which is finalized at falling of the data latch signal 57 after inputting of the data latch signal 57. In other words, the latch circuit 3 reads out the pixel data corresponding to the same pixels as those which correspond to the pixel data which is written in the GRAM 2.

FIG. 8 illustrates this. In synchronization to the data latch signal 57, the latch circuit 3 reads pixel data stored in memory elements 72 of the GRAM 2 and stores thus read pixel data into a memory element 75 of the latch circuit 3. Meanwhile, among memory elements 71 of the GRAM 2, pixel data is written in the memory element 73 in synchronization to the memory clock signal 58. Thus, contention occurs in the memory element 73, as the pixel data is written here in synchronization to the memory clock signal 58 but the pixel data is read out at falling of the data latch signal 57.

In such a situation, first, while the display read control signal 56 stays in the H-state, that is, the discharge period, regardless of whether the L-state has been written in the bits of the memory elements which form the GRAM 2 or the H-state has been written there, all of display data at the corresponding bits becomes L, whereas in the latch circuit 3, the memory elements which form the latch circuit 3 still maintain previous data values.

When the display read control signal 56 is in the L-state, namely, during the memory update period, the latch circuit 3 reads out and stores the pixel data held in the memory elements which form the GRAM 2.

The memory clock signal 58 is fed while the display read control signal 56 is in the memory update period, and at falling of the memory clock signal 58, the pixel data are written in the GRAM 2. It is assumed here that with respect to the display data 59, the bits of the memory elements of the GRAM 2 corresponding to the display data 59 are set to the H-state before inputting of the memory clock signal 58. It is further assumed here that in response to inputting of the memory clock signal 58, the L-state is written at the bits of the memory elements of the GRAM 2 corresponding to the display data 59.

In such a situation, as for the display data 59 from the GRAM 2, prior to inputting of the memory clock signal 58, the previous data values, namely, the H-state is output during the memory update period. After inputting of the memory clock signal 58, the bits of the memory elements of the GRAM 2 corresponding to the display data 59 are written when the memory clock signal 58 falls. It is assumed that the L-state is written as the bits which correspond to the display data 59.

However, as described in relation to the conventional technique, the display data 59 from the GRAM 2 remains in the H-state during the memory update period once set to the H-state, independently of which values the pixel data stored in the GRAM 2 has. While the display read control signal 56 stays in the H-state, that is, the discharge period, the display data 59 from the GRAM 2 all becomes L regardless of whether the bits of the memory elements forming the GRAM 2 corresponding to the display data 59 are in the H-state or the L-state. This is the characteristic of display data output from the GRAM 2.

Hence, since the display data 59 output from the GRAM 2 has once been set to the H-state during the memory update period, the display data 59 remains in the H-state during the memory update period despite writing of the L-state at the bits of the GRAM 2 corresponding to the display data 59.

The display data 60 is set to the L-state before inputting of the memory clock signal 58, and after the memory clock signal 58 is input, the H-state is written in association with the pixel data which is written in the GRAM 2, at falling of the memory clock signal 58. In this case, once the pixel data has been written in the GRAM 2, the GRAM 2 outputs the H-state as the display data 60.

Next, after the data latch signal 57 is fed to the latch circuit 3, the latch circuit 3 finalizes the respective bits of the memory elements which form the latch circuit 3 at falling of the data latch signal 57.

When the latch circuit 3 thus finalizes the respective bits of the memory elements forming the latch circuit 3 in response to the data latch signal 57, since the display data 59 is maintained in the H-state during the memory update period, although the bits of the memory elements forming the GRAM 2 corresponding to the display data 59 indicate the L-state, the bits of the memory elements forming the latch circuit 3 corresponding to the display data 59 stay finalized in the H-state. In short, even though the bits of the memory elements forming the GRAM 2 corresponding to the display data 59 are in the L-state, the bits of the memory elements forming the latch circuit 3 corresponding to the display data 59 are finalized in the H-state, presenting a disagreement in terms of the same bit value at the same pixels between the GRAM 2 and the latch circuit 3.

A display error thus occurs in the event that the memory clock signal 58 is input while the display read control signal 56 is in the L-state, that is, the memory update period, and pixels for pixel data written in the GRAM 2 at falling of the memory clock signal 58 after inputting of the memory clock signal 58 are among those pixels which are for pixel data representing a horizontal scanning line which is finalized at falling of the data latch signal 57 after inputting of the data latch signal 57.

In other words, a display error occurs upon contention between writing of the pixel data in the GRAM 2 and reading of the pixel data equivalent to the horizontal scanning line to the latch circuit 3 from the GRAM 2.

The foregoing has described that display data output from the GRAM 2 has the following characteristic. That is, during the memory update period, once set to the H-state, display data output from the GRAM 2 remains in the H-state independently of which values the pixel data stored in the GRAM 2 has. The display data output from the GRAM 2 can be returned to the L-state only after the display read control signal 56 has changed to the H-state, i.e., the discharge period.

A similar problem to the above could occur however even when display data output from the GRAM 2 has a characteristic that even after once set to the H-state, the display data output from the GRAM 2 can be set to the L-state once again during the memory update period as the values of the pixel data stored in the GRAM 2 are set to the L-state.

FIG. 7 is a different timing chart from that in FIG. 6, showing the various types of drive signals and the control signal to the video processing circuit 13. Further, in this case, display data output from the GRAM 2 has a characteristic that even after once set to the H-state, the display data output from the GRAM 2 can be set to the L-state once again during the memory update period as the values of the pixel data stored at the bits of the memory elements forming the GRAM 2 corresponding to this display data are set to the L-state.

In the timing chart in FIG. 7, the display read control signal 9 shown in FIG. 4 is shown as a display read control signal 61, the data latch signal 10 shown in FIG. 4 is shown as a data latch signal 62, and the memory clock signal 12 shown in FIG. 4 is shown as a memory clock signal 63. Further, in FIG. 7, display data 64 and display data 65 are output data from the GRAM 2 corresponding to the bits of pixel data stored in the GRAM 2, of which the display data 64 is output data which is output from the GRAM 2 when corresponding bits are set to the L-state from the H-state, and the display data 65 is output data which is output from the GRAM 2 when corresponding the bits are set to the H-state from the L-state.

In such a situation, the display data all becomes L and the respective bits of the memory elements forming the latch circuit 3 maintain previous data values while the display read control signal 61 stays in the H-state, that is, the discharge period.

While the display read control signal 61 stays in the L-state, that is, the memory update period, the latch circuit 3 reads out and stores pixel data equivalent to one scanning line from the GRAM 2.

However, as clearly shown in FIG. 7, the data latch signal 62 and the memory clock signal 63 are input at the same time during the memory update period. In other words, writing of the pixel data in the GRAM 2 takes place simultaneously with reading of pixel data equivalent to one scanning line including the pixel data above to the latch circuit 3.

In such a situation, which values the data read as the display data 64 and the display data 65 to the latch circuit 3 may have is unknown, and therefore, a display error occurs.

Thus, there is a problem that a display error occurs as contention arises between writing of pixel data in the GRAM 2 and reading of pixel data equivalent to one scanning line including the pixel data above in any one of the situations described above.

In light of this problem, the present invention aims at providing a video processing circuit which is free from a display error even despite contention between writing of pixel data in the GRAM 2 and reading of pixel data equivalent to one scanning line including the pixel data above, a control method for such a video processing circuit, and an integrated circuit.

The 1$^{st}$ aspect of the present invention is a video signal processing circuit, comprising:

a GRAM which stores pixel data, which is data corresponding to pixels of a display screen, at least in the amount equivalent to said display screen, said pixel data being written in said GRAM in synchronization to a memory clock signal;

a latch circuit which reads and stores pixel data corresponding to pixels representing a scanning line of said display screen from said GRAM; and a control unit, wherein said pixel data corresponding to said pixels representing said scanning line stored in said latch circuit is displayed on said display screen, and in the case of contention between writing of said pixel data in said GRAM and reading of said pixel data corresponding to said pixels representing said scanning line to said latch circuit from said GRAM, said control unit delays for a predetermined delay time reading of said pixel data corresponding to said pixels representing said scanning line and controls so as to perform reading of said pixel data corresponding to said pixels representing said scanning line to said latch circuit from said GRAM once again.

The 2$^{nd}$ aspect of the present invention is the video signal processing circuit of the 1st aspect of the present invention, wherein said control unit comprises a delay unit which delays and inputs a display read control signal and a data latch signal for said predetermined delay time during a period which is after a point at which said memory clock signal corresponding to writing of said pixel data in said GRAM is supplied, said writing accompanying said contention, but which is before supplying of the next memory clock signal following said memory clock signal so that said latch circuit reads pixel data corresponding to pixels representing said scanning line.

The 3$^{rd}$ aspect of the present invention is the video signal processing circuit of the 2$^{nd}$ aspect of the present invention, wherein said predetermined delay time can be adjusted in a variable manner.

The 4$^{th}$ aspect of the present invention is the video signal processing circuit of the 1st aspect of the present invention, wherein said control unit comprises a monitoring unit which monitors whether writing of said pixel data in said GRAM contends against reading of said pixel data corresponding to said pixels representing said scanning line to said latch circuit from said GRAM.

The 5$^{th}$ aspect of the present invention is the video signal of the 4$^{th}$ aspect of the present invention, wherein said control unit comprises a delay unit which delays reading of said pixel data corresponding to said pixels representing said scanning line based on a monitoring result obtained by said monitoring unit and controls so as to perform reading of said pixel data corresponding to said pixels representing said scanning line to said latch circuit from said GRAM once again.

The 6$^{th}$ aspect of the present invention is the video signal processing circuit of the 1$^{st}$ aspect of the present invention, wherein when writing of said pixel data in said GRAM is executed plural times during a contention-free memory update period in which said pixel data corresponding to said pixels representing said scanning line are read to said latch circuit from said GRAM said control unit upon occurrence of said contention delays reading of said pixel data corresponding to said pixels representing said scanning line between a period of writing said pixel data and a period of writing next pixel data, and controls so as to perform reading of said pixel data corresponding to said pixels representing said scanning line to said latch circuit from said GRAM again plural times during said contention-free memory update period.

The 7$^{th}$ aspect of the present invention is a method of controlling a video signal processing circuit which comprises:

a GRAM which stores pixel data, which is data corresponding to pixels of a display screen, at least in the amount equivalent to said display screen, said pixel data being written in said GRAM in synchronization to a memory clock signal;

a latch circuit which reads and stores pixel data corresponding to pixels representing a scanning line of said display screen from said GRAM; and a control unit, said method comprising a step at which in the case of contention between writing of said pixel data in said GRAM and reading of said pixel data corresponding to said pixels representing said scanning line to said latch circuit from said GRAM, said control unit delays for a predetermined delay time reading of said pixel data corresponding to said pixels representing said scanning line.

The 8th aspect of the present invention is an integrated circuit in which the video signal processing circuit of the 1st aspect of the present invention is incorporated.

EXPLANATION OF THE REFERENCE SYMBOLS

Figure 1:
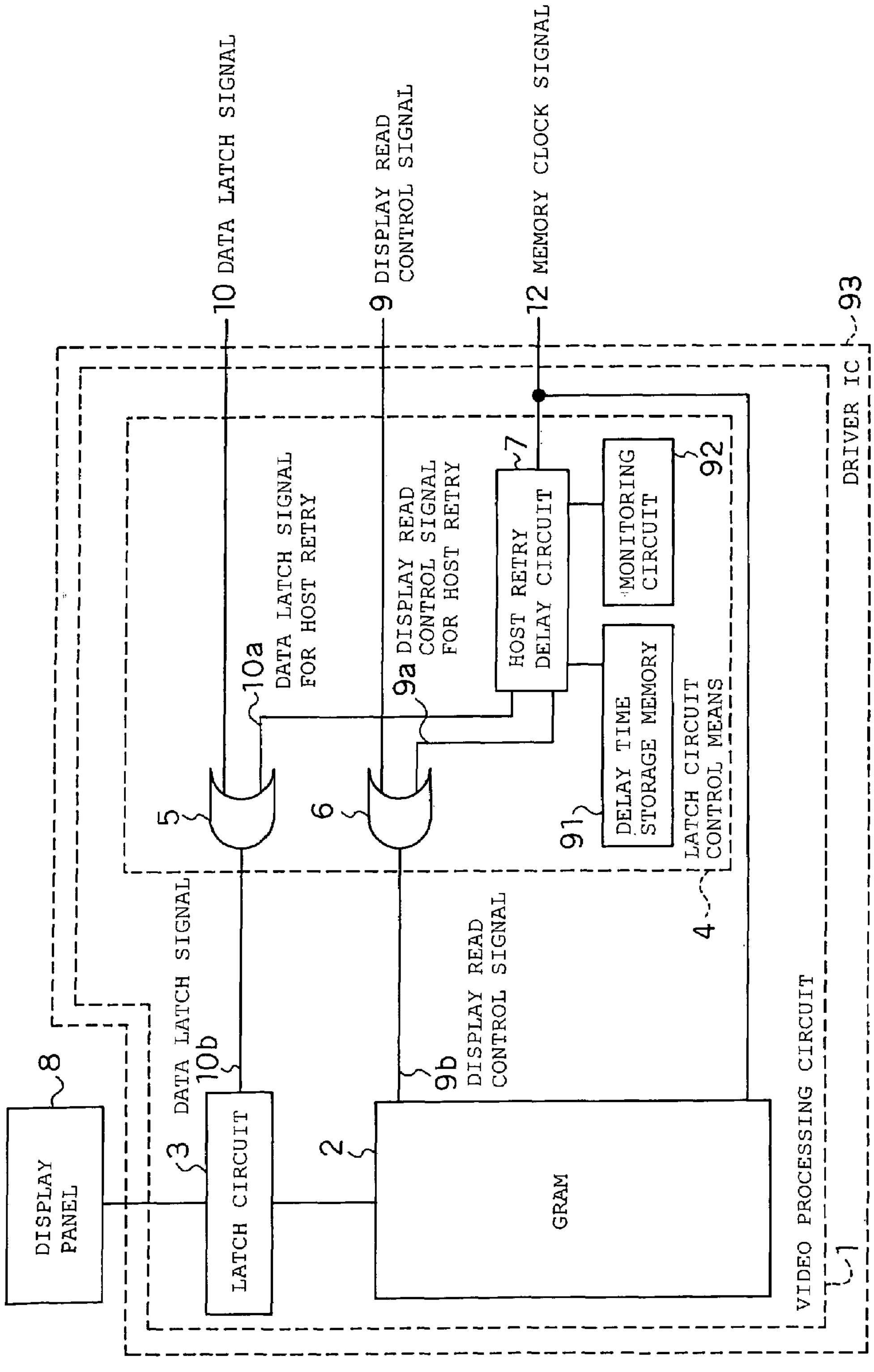
FIG. 1 is a drawing which shows the structure of a video processing circuit according to a first and a second embodiments of the present invention.

1 video processing circuit
2 GRAM
3 latch circuit
4 latch circuit control unit
5 OR circuit
6 OR circuit
7 host retry delay circuit
8 display panel
9 display read control signal
9*a* display read control signal for host retry
9*b* display read control signal
10 data latch signal
10*a* data latch signal for host retry
10*b* data latch signal
91 delay time storage memory
92 monitoring circuit 92
93 driver IC

BEST MODE FOR IMPLEMENTING THE INVENTION

Embodiments of the present invention will now be described with reference to the associated drawings.

First Embodiment

FIG. 1 shows a video processing circuit 1 according to the first embodiment. The video processing circuit 1 according to the first embodiment is used in a mobile phone, etc.

The video processing circuit 1 comprises a latch circuit 3, a GRAM (graphics Random access memory) 2 and a control unit 4. The GRAM 2 is a readable/writable memory which stores pixel data amounting to one screen displayed by a display panel 8, and in this memory, pixel data corresponding to one pixel which forms the display panel 8 is written in synchronization to a memory clock signal 12 which is input.

The latch circuit 3 is a circuit which reads from the GRAM 2 pixel data equivalent to one scanning line displayed by the display panel 8 and which stores the same.

The control unit 4 is a circuit which generates a control signal, which controls so that pixel data equivalent to one scanning line will be read again from the GRAM 2 to the latch circuit 3 upon occurrence of contention between writing of pixel data in the GRAM 2 and reading of pixel data equivalent to one scanning line to the latch circuit 3 from the GRAM 2, and outputs the control signal to the latch circuit 3.

The control unit 4 comprises a delay circuit 7, an OR circuit 5, an OR circuit 6, a delay time storage memory 91 and a monitoring circuit 92.

The delay circuit 7 is a circuit which delays an incoming memory clock signal 12 and generates a data latch signal 10*a* for re-reading of data from the GRAM 2 (hereinafter referred to as "for host retry") and a display read control signal for host retry 9*a*.

The OR circuit 5 is a circuit which outputs, as a data latch signal 10*b*, a signal which is OR of the data latch signal 10 and the data latch signal for host retry 10*a* which is generated by the delay circuit 7.

The OR circuit 6 is a circuit which outputs, as a display read control signal 9*b*, a signal which is OR of the display read control signal 9 and the display read control signal for host retry 9*a* which is generated by the delay circuit 7.

The delay time storage memory 91 is a memory which stores information regarding a period of time by which the incoming memory clock signal 12 is delayed by the delay circuit 7.

The monitoring circuit 92 is a circuit which monitors whether contention occurs or not.

Further, the video processing circuit 1 is incorporated, together with other video processing function, within a driver IC 93 which is an integrated circuit formed as one chip.

The delay circuit 7 and the delay time storage memory 91 according to this embodiment is an example of the delay unit of the present invention.

An operation of the video processing circuit 1 according to this embodiment will now be described.

The display read control signal 9, the data latch signal 10 and the memory clock signal 12 are input to the control unit 4. Meanwhile, the memory clock signal 12 is input to the GRAM 2.

Figure 2:
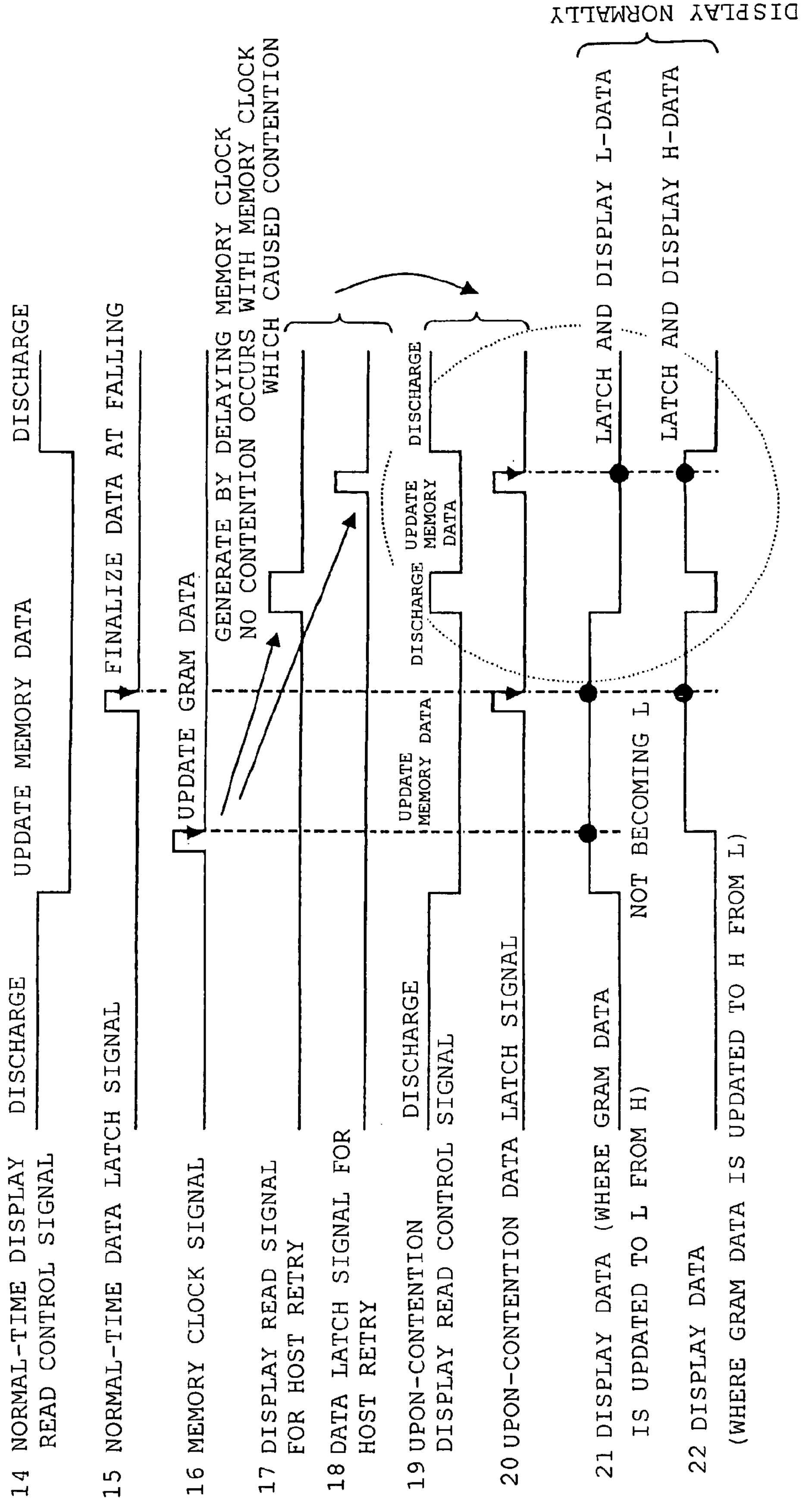
FIG. 2 is a timing chart of various types of drive signals and a control signal to the video processing circuit according to the first embodiment of the present invention.

FIG. 2 is a timing chart of the various types of drive signals and the control signal to the video processing circuit 1.

In the timing chart in FIG. 2, the display read control signal 9 shown in FIG. 1 is shown as a display read control signal 14, the data latch signal 10 shown in FIG. 1 is shown as a data latch signal 15, the memory clock signal 12 shown in FIG. 1 is shown as a memory clock signal 16, the display read control signal for host retry 9*a* generated by the delay circuit 7 upon occurrence of contention is shown as a display read control for host retry 17, and the data latch signal for host retry 10*a* generated by the delay circuit 7 upon occurrence of contention is shown as a data latch signal for host retry 18. Further, in FIG. 2, the display read control signal 9*b* output from the OR circuit 6 is shown as an upon-contention display read control signal 19, and the data latch signal 10*b* output from the OR circuit 5 is shown as an upon-contention data latch signal 20.

In short, the OR circuit 6 outputs, as the upon-contention display read control signal 19, a signal which is OR of the display read control signal 9 and the display read control signal for host retry 9*a* which is output from the delay circuit 7. Meanwhile, the OR circuit 5 outputs, as the upon-contention data latch signal 20, a signal which is OR of the data latch signal 10 and the data latch signal for host retry 10*a* which is output from the delay circuit 7.

In FIG. 2, display data 21 and display data 22 are each output data corresponding to the bits of the memory elements forming the GRAM 2, of which the display data 21 is data which is output when the bits of the memory elements forming the GRAM 2 are set to the L-state from the H-state, and the display data 22 is data which is output when the bits of the memory elements forming the GRAM 2 are set to the H-state from the L-state.

The display read control signal 9*b* is a control signal which can be in the H (High)-state which is indicative of a discharge period and the L (Low)-state which is indicative of a memory update period, and all of display data from the GRAM 2 becomes L and the respective bits of the memory elements forming the latch circuit 3 maintain previous data values while the display read control signal 9*b* fed to the GRAM 2 is in the H-state, that is, the discharge period.

Meanwhile, when the display read control signal 9*b* fed to the GRAM 2 is in the L-state, that is, the memory update period, the latch circuit 3 reads and stores pixel data equivalent to one scanning line from the GRAM 2.

However, once set to the H-state, display data output from the GRAM 2 remains H during the memory update period, regardless of the values of the bits of the memory elements which form the GRAM 2. Display data output from the GRAM 2 can be returned to the L-state only after the display read control signal 9*b* has become H, i.e., during the discharge period. This is the characteristic of display data output from the GRAM 2.

Once the data latch signal 10*b* is fed to the latch circuit 3, the latch circuit 3 finalizes the values of the respective bits of the memory elements forming the latch circuit 3 in response to falling of the data latch signal 10*b*.

Further, when pixel data are written in the GRAM 2, the memory clock signal 12 is fed to the GRAM 2 and the memory clock signal 12 falls. In this manner, the pixel data are written in the GRAM 2 in synchronization to the memory clock signal 12.

Writing of the pixel data in the GRAM 2 takes place independently of reading of the pixel data equivalent to one scanning line from the GRAM 2 to the latch circuit 3.

This operation is summarized as follows.

In the timing chart in FIG. 2, the memory clock signal 16 is fed while a normal-time display read control signal 14 remains in the L-state, that is, the memory update period.

Further, pixels for pixel data which is written in the GRAM 2 at falling of the memory clock signal 16 after inputting of the memory clock signal 16 are among those pixels which are for pixel data representing a horizontal scanning line which is finalized at falling of a normal-time data latch signal 15 after inputting of the normal-time data latch signal 15. In other words, the latch circuit 3 reads the pixel data corresponding to the same pixels as those which correspond to the pixel data which is written in the GRAM 2.

In such a situation, first, while the normal-time display read control signal 14 remains in the H-state, that is, while the upon-contention display read control signal 19 stays in the H-state, i.e., during the discharge period, the display data all becomes L and the respective bits of the memory elements forming the latch circuit 3 maintain previous data values.

When the normal-time display read control signal 14 is in the L-state, that is, when the upon-contention display read control signal 19 is in the L-state, i.e., during the memory update period, the latch circuit 3 reads out and stores the pixel data stored in the GRAM 2, as denoted by the normal-time data latch signal 15 and the upon-contention data latch signal 20.

When the upon-contention display read control signal 19 is in the L-state, i.e., the memory update period, the memory clock signal 16 is input, and at falling of the memory clock signal 16, the pixel data is written in the GRAM 2. It is assumed here that the bits of the memory elements which form the GRAM 2 corresponding to the display data 21 are set to the H-state before inputting of the memory clock signal 16. It is also assumed that the L-state is written at these bits when the memory clock signal 16 is input.

In such a situation, the latch circuit 3 has already read and stored the bits of the display data 21 during the memory update period prior to inputting of the memory clock signal 16. The memory clock signal 16 is then input, and at falling of the memory clock signal 16, the bits of the memory elements which form the GRAM 2 corresponding to the display data 21 are written. It is assumed that the L-state is written at these bits.

However, as described in relation to the conventional technique, the display data from the GRAM 2 remains in the H-state during the memory update period once set to the H-state, regardless of which values are set at the bits of the memory elements which form the GRAM 2. The display data output from the GRAM 2 can be returned to the L-state only after the upon-contention display read control signal 19 has become H, i.e., during the discharge period. This is the characteristic of display data output from the GRAM 2.

Therefore, the bits of the memory elements which form the GRAM 2 corresponding to the display data 21 have been set already to the H-state, and the display data 21 output from the GRAM 2 remains in the H-state during the memory update period.

The bits of the memory elements which form the GRAM 2 corresponding to the display data 22 are set to the L-state before inputting of the memory clock signal 16, the memory clock signal 16 is then input, and at falling of the memory clock signal 16, the H-state is written at these bits. In this case, as the pixel data is written in the GRAM 2, the GRAM 2 outputs the H-state as the display data 22.

Next, upon receipt of the upon-contention data latch signal 20 at the latch circuit 3, the latch circuit 3 finalizes the respective bits stored in the memory elements which form the latch circuit 3 in response to falling of the upon-contention data latch signal 20.

When the latch circuit 3 thus finalizes the respective bits of the memory elements forming the latch circuit 3 in response to the upon-contention data latch signal 20, with respect to the display data 21, even though the bits of the memory elements which form the GRAM 2 corresponding to the display data 21 are in the L-state, the bits of the memory elements which form the latch circuit 3 corresponding to the display data 21 remain finalized in the H-state.

A display error thus occurs in a condition that the memory clock signal 16 is input while the upon-contention display read control signal 19 is in the L-state, i.e., the memory update period, and pixels for pixel data which is written in the GRAM 2 at falling of the memory clock signal 16 after inputting of the memory clock signal 16 are among those pixels which are for pixel data representing a horizontal scanning line which is finalized at falling of the upon-contention data latch signal 20 after inputting of the upon-contention data latch signal 20.

Such contention between writing of pixel data in the GRAM 2 and reading of pixel data by the latch circuit 3 could occur as the memory clock signal changes to the H-state while the normal-time display read control signal 14 is in the memory update period. The monitoring circuit 92 therefore monitors whether such contention could occur. In short, the monitoring circuit 92 monitors whether the memory clock signal 16 changes to the H-state during a monitoring section described below. When the memory clock signal 16 changes to the H-state during the monitoring section, the monitoring circuit 92 activates the delay circuit 7 and makes the latch circuit 3 execute re-reading as described below.

The monitoring section herein referred to is a section of the memory update period of the normal-time display read control signal 14, exclusive of a predetermined period from the end of the memory update period. The predetermined period is set as a sufficiently long period which permits the latch circuit 3 re-read pixel data representing one horizontal scanning line from the GRAM 2.

Since the monitoring circuit 92 operates based on a synchronizing signal which is used in common within the driver IC 93, it is possible to calculate in advance the timing at which the data latch signal 10, the display read control signal 9 and the like are input, utilizing the synchronizing signal which is used in common within the driver IC 93. It is thus possible to calculate the monitoring section mentioned above in advance from this synchronizing signal.

Detecting that the memory clock signal 16 changes to the H-state during the monitoring section, as described above, the monitoring circuit 92 controls the delay circuit 7 and makes the delay circuit 7 perform the following operation.

That is, the delay circuit 7 of the control unit 4 receives the memory clock signal 16 and delays the memory clock signal 16 by a predetermined time, generates the display read control for host retry 17 and the data latch signal for host retry 18, and outputs these respectively to the OR circuit 6 and the OR circuit 5. The predetermined time above is determined based on information which is indicative of a delay time which is stored in the delay time storage memory 91. Also set in advance by a command within the delay time storage memory 91 is information indicative of the delay time. It is possible to set the information indicative of the delay time once again by a command.

As the upon-contention display read control signal 19, the OR circuit 5 outputs to the latch circuit 3 a signal which is OR of the normal-time display read control signal 14 and the display read control for host retry 17.

As the upon-contention data latch signal 20, the OR circuit 6 outputs to the latch circuit 3 a signal which is OR of the normal-time data latch signal 15 and the data latch signal for host retry 18.

As a result, after becoming the L-state, the upon-contention display read control signal 19 is set again to the H-state. In accordance with the upon-contention display read control signal 19 therefore, the latch circuit 3 sets the respective bits of the memory elements forming the latch circuit 3 to the L-state once again.

After thus becoming the H-state, the upon-contention display read control signal 19 is set again to the L-state. As the upon-contention display read control signal 19 is set again to the L-state, the latch circuit 3 reads out and stores pixel data representing one scanning line which is stored in the GRAM 2.

While the upon-contention display read control signal 19 stays set again to the L-state, the upon-contention data latch signal 20 is input. When the upon-contention data latch signal 20 falls, the latch circuit 3 finalizes thus stored pixel data representing one scanning line.

In the case of contention between writing of pixel data in the GRAM 2 and reading of pixel data representing one scanning line to the latch circuit 3 from the GRAM 2, the control unit 4 delays the discharge period, the memory update period and the timing of finalizing data, starting at the memory clock signal 16 at which the contention has occurred, by a predetermined time which is based on the information indicative of the delay time stored in the delay time storage memory 91, as denoted at the upon-contention display read control signal 19 and the upon-contention data latch signal 20. Hence, even despite contention between writing of pixel data in the GRAM 2 and reading of pixel data from the GRAM 2 to the latch circuit 3, the latch circuit 3 can execute re-reading while the display read control signal 9 is in the memory update period, and therefore, it is possible to read normally pixel data representing one scanning line from the GRAM 2 to the latch circuit 3.

Although the foregoing has described that the monitoring circuit 92 monitors whether the memory clock signal 12 has changed to the H-state during the monitoring section, and when there is a possibility of contention with the memory clock signal 12 changing to the H-state during the monitoring section, the monitoring circuit 92 activates the delay circuit 7 and makes the latch circuit 3 execute re-reading according to the first embodiment, this is not limiting. When detecting that the memory clock signal 12 has changed to the H-state during the monitoring section, the monitoring circuit 92 may further detect whether a display error will actually occur because of contention, and activate the delay circuit 7 and make the latch circuit 3 execute re-reading only when contention will actually occur, leading to a display error.

In addition, while the foregoing has described that the monitoring section is a portion of the memory update period for the display read control signal 9 which is exclusive of a predetermined period from the end, this is not limiting. The beginning of the monitoring section may be a point which is a predetermined time of L-period of the upon-contention display read control signal ahead of a point at which the display read control signal 9 enters the memory update period, whereas the end of the monitoring section may be a point which is a predetermined time ahead of the end of the memory update period as in the first embodiment described above. When the beginning of the monitoring section is thus set to a point ahead of the beginning of the memory update period, while the latch circuit 3 could execute re-reading although a display error will not actually occur despite contention, a display error can be nevertheless avoided.

Although the foregoing has described that the monitoring circuit 92 is incorporated together with other video processing function within the integrated circuit formed as one chip, this is not limiting. Further, the video processing circuit 1 may be incorporated within plural integrated circuits together with other video processing function.

Second Embodiment

The second embodiment will now be described.

FIG. 1 shows a video processing circuit 1 according to the second embodiment. The video processing circuit 1 according to the second embodiment is used in a mobile phone or the like, as in the first embodiment.

The structure of the video processing circuit 1 according to the second embodiment is similar to that according to the first embodiment, and therefore, will not be described.

An operation of the video processing circuit 1 according to the second embodiment will now be described, with a main focus on differences from the first embodiment.

In the first embodiment, in the case of contention between writing of pixel data in the GRAM 2 and reading of pixel data representing one scanning line to the latch circuit 3 from the GRAM 2, the memory update period, the discharge period and the timing of finalizing data are delayed by the predetermined time.

However, mere delaying of the memory update period, the discharge period and the timing at which the latch circuit 3 finalizes data by the predetermined time may result in another contention between the next memory clock signal following the contention-bearing memory clock signal, the delayed memory update period and the delayed timing at which the latch circuit 3 finalizes data.

To avoid this, the second embodiment ensures that the delayed memory update period, the delayed discharge period and the delayed timing of finalizing data come between the contention-bearing memory clock signal and the next memory clock signal which follows the contention-bearing memory clock signal. To this end, as the information indicative of the delay time, the delay time storage memory 91 stores as a command in advance a time calculated from a cycle in which the memory clock signal 12 changes to the H-state for example.

The delay circuit 7 and the delay time storage memory 91 according to the second embodiment is an example of the delay unit of the present invention.

Figure 3:
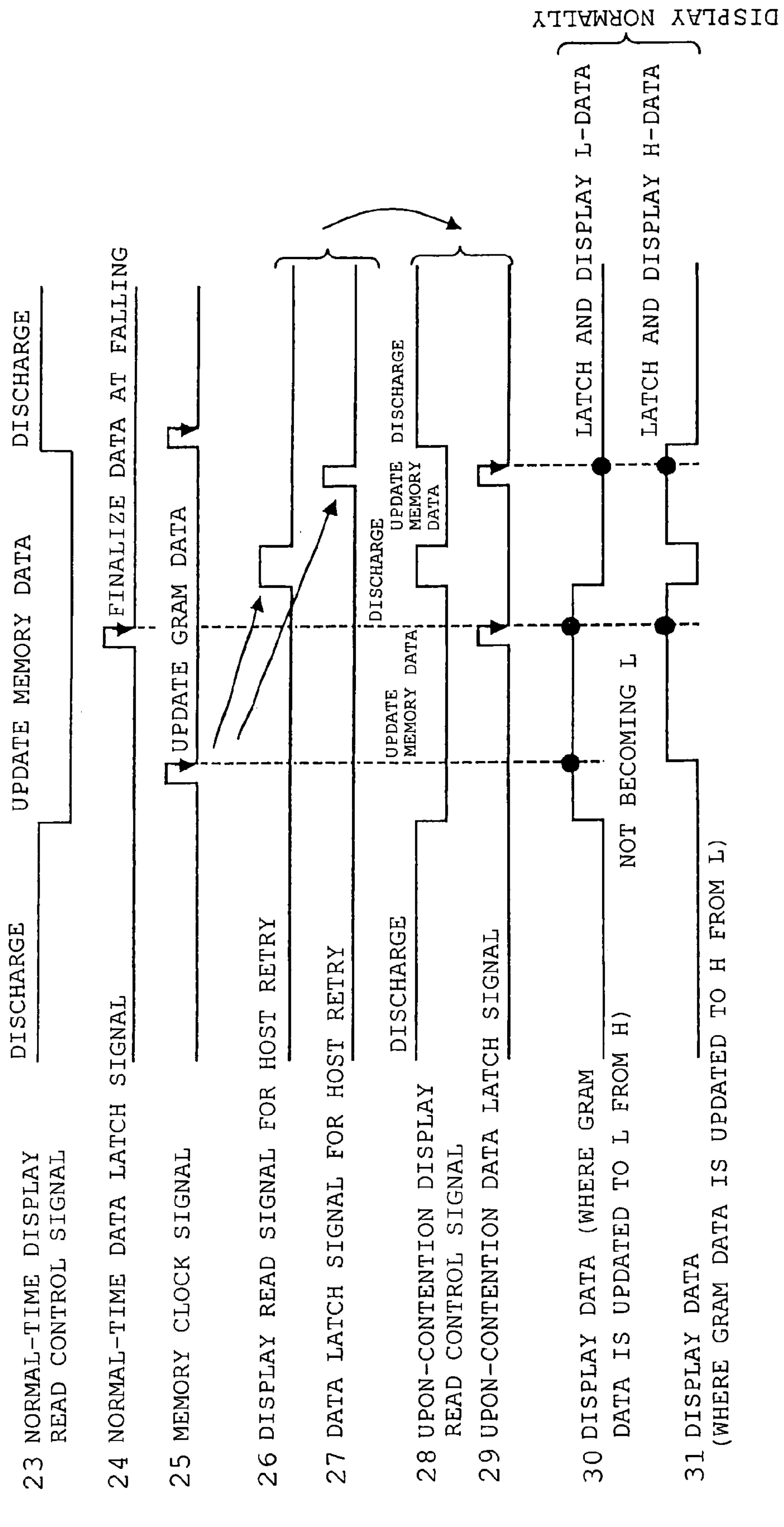
FIG. 3 is a timing chart of various types of drive signals and a control signal to the video processing circuit according to the second embodiment of the present invention.
Figure 4:
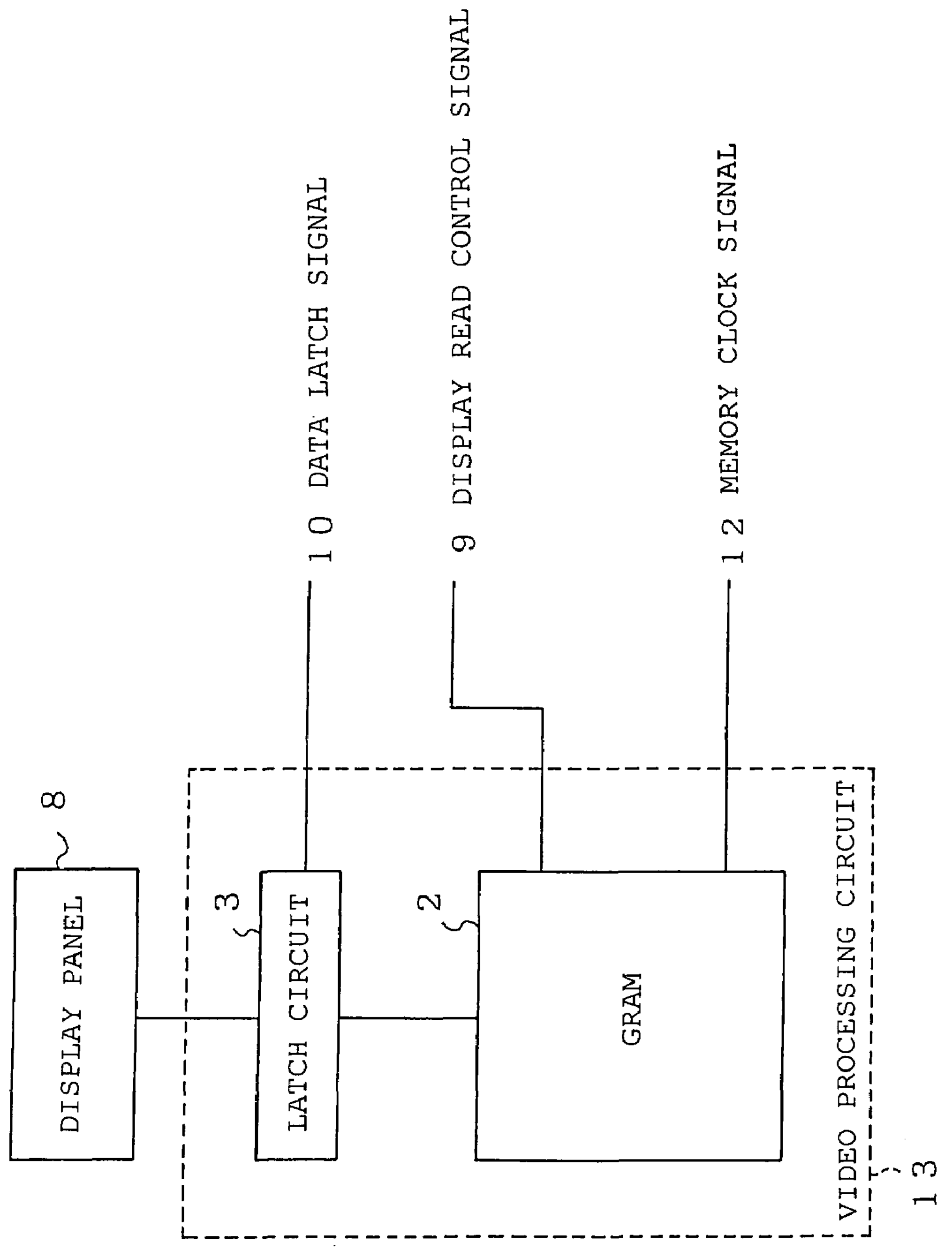
FIG. 4 is a drawing which shows the structure of a conventional video processing circuit.
Figure 5:
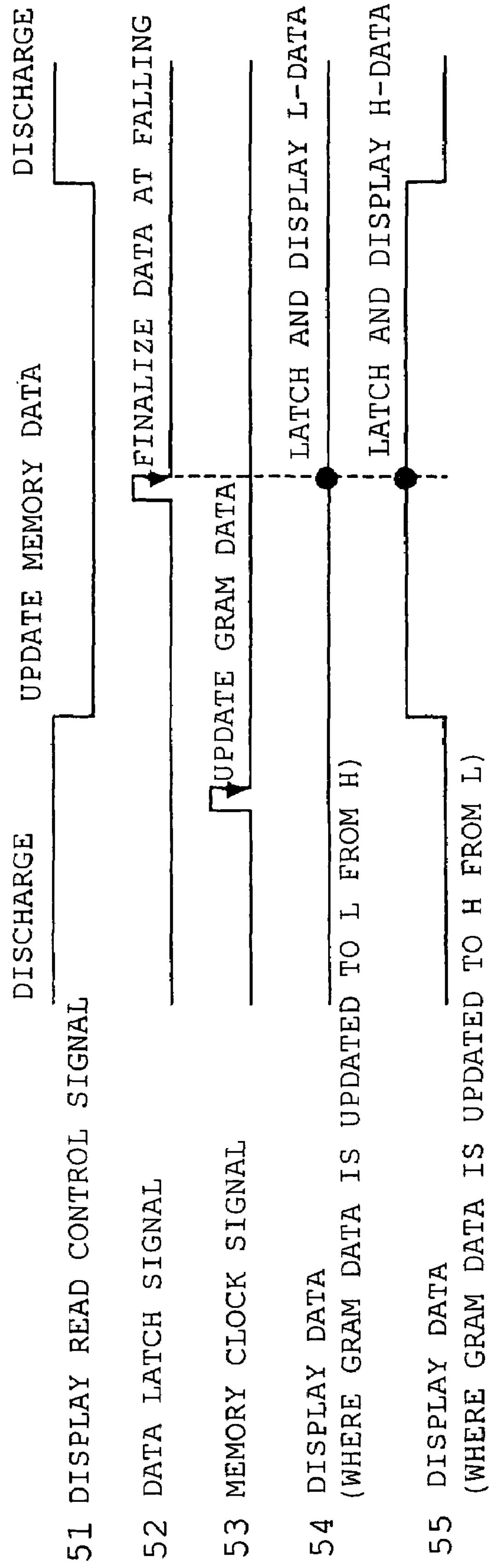
FIG. 5 is a timing chart of various types of drive signals and a control signal to the conventional video processing circuit.
Figure 6:
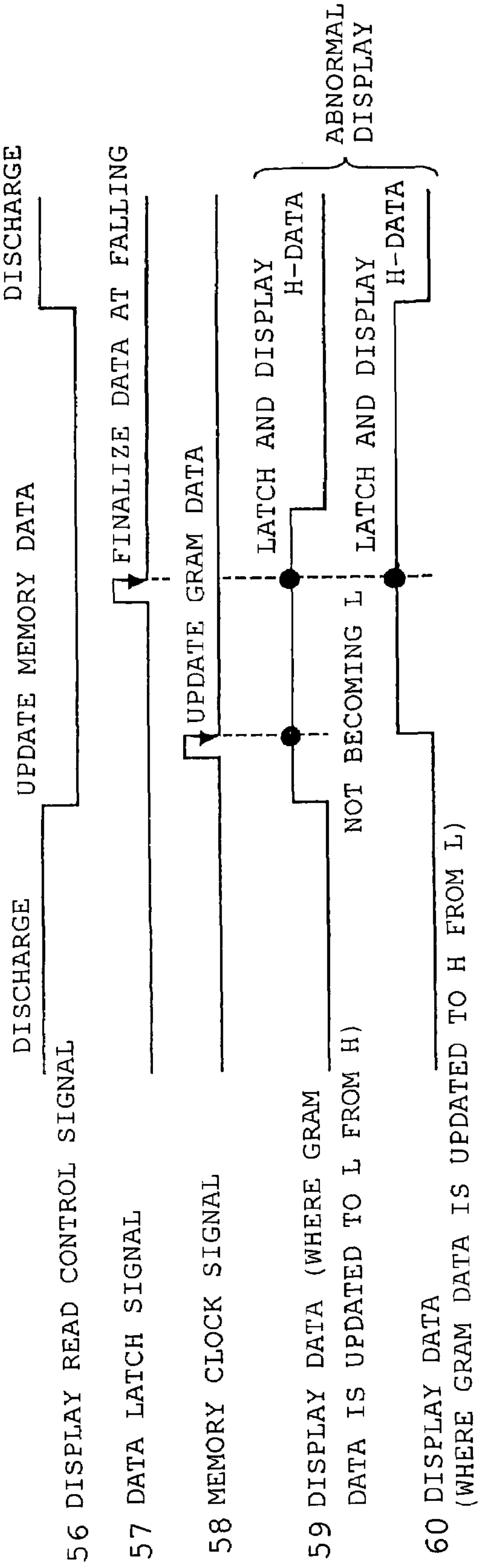
FIG. 6 is a timing chart of the various types of drive signals and the control signal as they are upon occurrence of contention in the conventional video processing circuit.
Figure 7:
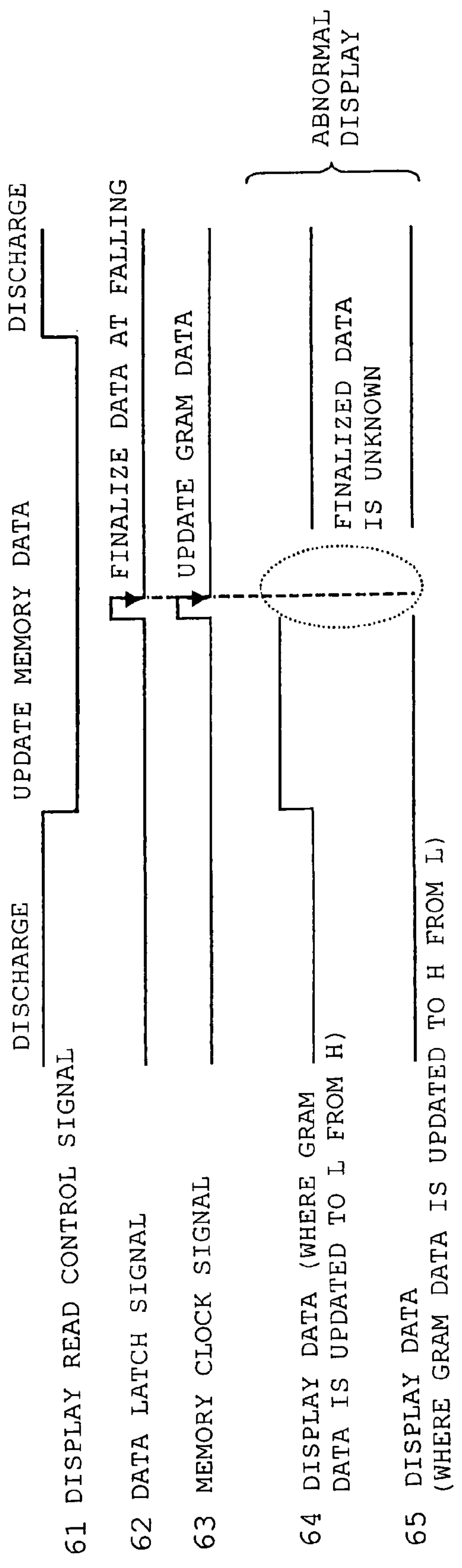
FIG. 7 is a timing chart of the various types of drive signals and the control signal as they are upon occurrence of contention in the conventional video processing circuit.
Figure 8:
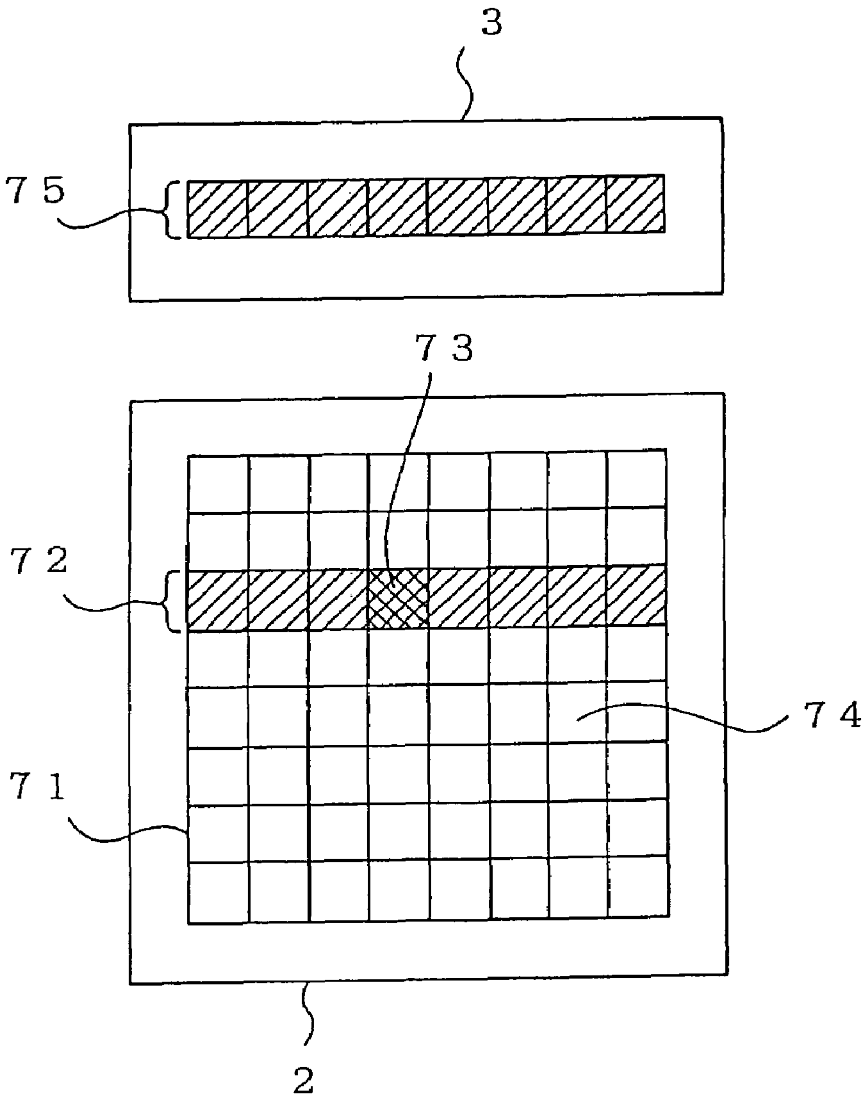
FIG. 8 is a drawing which shows the states of memory elements of a GRAM 2 and a latch circuit 3 upon occurrence of contention.

FIG. 3 is a timing chart of various types of drive signals and a control signal to the video processing circuit 1.

In the timing chart in FIG. 3, the display read control signal 9 shown in FIG. 1 is shown as a normal-time display read control signal 23, the data latch signal 10 shown in FIG. 1 is shown as a normal-time data latch signal 24, the memory clock signal 12 shown in FIG. 1 is shown as a memory clock signal 25, the display read control signal for host retry 9*a* generated by the delay circuit 7 upon occurrence of contention is shown as a display read control for host retry 26, and the data latch signal for host retry 10*a* generated by the delay circuit 7 upon occurrence of contention is shown as a data latch signal for host retry 27. Further, in FIG. 3, the display read control signal 9*b* output from the OR circuit 6 is shown as an upon-contention display read control signal 28, and the data latch signal 10*b* output from the OR circuit 5 is shown as an upon-contention data latch signal 29.

In short, the OR circuit 6 outputs, as the upon-contention display read control signal 28, a signal which is OR of the display read control signal 9 and the display read control signal for host retry 9*a* which is output from the delay circuit 7. Meanwhile, the OR circuit 5 outputs, as the upon-contention data latch signal 29, a signal which is OR of the data latch signal 10 and the data latch signal for host retry 10*a* which is output from the delay circuit 7.

In FIG. 3, display data 30 and display data 31 are each output data from the GRAM 2 corresponding to the bits of the memory elements forming the GRAM 2, of which the display data 30 is data which is output when the bits of the memory elements forming the GRAM 2 are set to the L-state from the H-state, and the display data 31 is data which is output when the bits of the memory elements forming the GRAM 2 are set to the H-state from the L-state.

In the timing chart in FIG. 3, the memory clock signal 25 is input while the normal-time display read control signal 23 is in the L-state, that is, the memory update period.

Upon inputting of the memory clock signal 25, pixels for pixel data which is written in the GRAM 2 at falling of the memory clock signal 25 are among those pixels which are for pixel data representing a horizontal scanning line which is finalized at falling of the normal-time data latch signal 24 after inputting of the normal-time data latch signal 24. In other words, the latch circuit 3 reads the pixel data corresponding to the same pixels as those which correspond to the pixel data which is written in the GRAM 2.

This gives rise to contention between writing in the GRAM 2 and reading from the GRAM 2 to the latch circuit 3, as in the first embodiment.

The monitoring circuit 92 therefore monitors whether such contention could occur, in a similar manner to that in the first embodiment.

In such a situation, first, while the normal-time display read control signal 23 remains in the H-state, that is, while the upon-contention display read control signal 28 stays in the H-state, i.e., during the discharge period, the display data becomes L and the respective bits of the memory elements forming the latch circuit 3 maintain previous data values.

When the normal-time display read control signal 23 is in the L-state, that is, when the upon-contention display read control signal 28 is in the L-state, i.e., during the memory update period, the latch circuit 3 reads out and stores the pixel data stored in the GRAM 2, as denoted by the normal-time data latch signal 24 and the upon-contention data latch signal 29.

The memory clock signal 25 is input while the upon-contention display read control signal 28 is in the memory update period, and when the memory clock signal 25 falls, the pixel data is written in the GRAM 2. It is assumed that the bits of the memory elements which form the GRAM 2 corresponding to the display data 30 are set to the H-state prior to inputting of the memory clock signal 25. At the timing of inputting of the memory clock signal 25, the L-state is written at the bits of the memory elements which form the GRAM 2 corresponding to the display data 30.

In such a case, the latch circuit 3 has already read and stored the bits of the display data 30 during the memory update period prior to inputting of the memory clock signal 25. The memory clock signal 25 is then input, and at falling of the memory clock signal 25, the bits of the memory elements which form the GRAM 2 corresponding to the display data 30 are written. It is assumed that the L-state is written as the bits of the memory elements which form the GRAM 2 corresponding to the display data 30.

However, as described in relation to the conventional technique, display data from the GRAM 2 remains in the H-state during the memory update period once set to the H-state, independently of which values are set at the bits of the memory elements which form the GRAM 2. The display data output from the GRAM 2 can be returned to the L-state only after the upon-contention display read control signal 28 has become H, i.e., during the discharge period. This is the characteristic of display data output from the GRAM 2.

Therefore, the bits of the memory elements which form the GRAM 2 corresponding to the display data 30 have been set already the H-state, and these bits remain in the H-state during the memory update period.

The bits of the memory elements which form the GRAM 2 corresponding to the display data 31 are set to the L-state before inputting of the memory clock signal 25, the memory clock signal 25 is then input, and at falling of the memory clock signal 25, the H-state is written at these bits in association with the pixel data which is written in the GRAM 2. In this case, as the pixel data is written in the GRAM 2, since the display data 31 output from the GRAM 2 indicates the H-state, the latch circuit 3 sets the bits of the memory elements which form the latch circuit 3 corresponding to the display data 31 to the H-state.

Next, upon receipt of the upon-contention data latch signal 29 at the latch circuit 3, the latch circuit 3 finalizes the respective bits stored in the memory elements which form the latch circuit 3 in response to falling of the upon-contention data latch signal 29.

When the latch circuit 3 thus finalizes the respective bits of the memory elements forming the latch circuit 3 in response to the upon-contention data latch signal 29, with respect to the display data 30, even though the bits of the memory elements which form the GRAM 2 corresponding to the display data 30 are in the L-state, the bits of the memory elements which form the latch circuit 3 corresponding to the display data 30 remain finalized in the H-state.

A display error thus occurs in a condition that the memory clock signal 25 is input while the upon-contention display read control signal 28 is in the L-state, i.e., during the memory update period, and pixels for pixel data which is written in the GRAM 2 at falling of the memory clock signal 25 after inputting of the memory clock signal 25 are among those pixels which are for pixel data representing a horizontal scanning line which is finalized at falling of the upon-contention data latch signal 29 after inputting of the upon-contention data latch signal 29.

Noting this, in this case, the delay circuit 7 of the control unit 4 receives the memory clock signal 12 and delays the memory clock signal 12 by a predetermined time, generates the display read control for host retry 26 and the data latch signal for host retry 27, and outputs these respectively to the OR circuit 6 and the OR circuit 5.

As the upon-contention display read control signal 28, the OR circuit 5 outputs to the latch circuit 3 a signal which is OR of the normal-time display read control signal 23 and the display read control for host retry 26.

As the upon-contention data latch signal 29, the OR circuit 6 outputs to the latch circuit 3 a signal which is OR of the normal-time data latch signal 24 and the data latch signal for host retry 27.

As a result, after becoming the L-state, the upon-contention display read control signal 28 is set again to the H-state. In accordance with the upon-contention display read control signal 28 therefore, the latch circuit 3 sets the respective bits of the memory elements forming the latch circuit 3 to the L-state once again.

The upon-contention display read control signal 28 is thereafter set again to the L-state. As the upon-contention display read control signal 28 is set again to the L-state, the latch circuit 3 reads out and stores pixel data representing one scanning line which is stored in the GRAM 2.

While the upon-contention display read control signal 28 stays set again to the L-state, the upon-contention data latch signal 29 is input. When the upon-contention data latch signal 29 falls, the latch circuit 3 finalizes thus stored pixel data representing one scanning line.

In the case of contention between writing of pixel data in the GRAM 2 and reading of pixel data representing one scanning line from the GRAM 2 to the latch circuit 3, the control unit 4 delays the discharge period, the memory update period and the timing of finalizing data by a predetermined time, starting at the memory clock signal 16 at which the contention has occurred, as denoted at the upon-contention display read control signal 28 and the upon-contention data latch signal 29. Under the control of the control unit 4, the discharge period and the memory update period start and feeding of the new upon-contention data latch signal 29 to the latch circuit 3 ends before the GRAM 2 receives the next memory clock signal 25 following the contention-bearing memory clock signal 25. This control is attained easily, as information indicative of a time which is based on the cycle of the memory clock signal 12 is set as the information indicative of the delay time stored in the delay time storage memory 91.

In short, this control is realized in the following manner for instance. At the stage that the delay circuit 7 delays the memory clock signal 25 thereby generating the display read control for host retry 26 and the data latch signal for host retry 27, the memory clock signal 25 is delayed considering the information indicative of the delay time stored in the delay time storage memory 91, namely, data which expresses the interval between the two memory clock signals 25 which are input one after another. The display read control for host retry 26 and the data latch signal for host retry 27 are generated such that by the time that the next memory clock signal 25 following the contention-bearing memory clock signal 25 is input, the new upon-contention display read control signal 28 has entered to the memory update period from the discharge period and has fallen while the new upon-contention data latch signal 29 is in the new memory update period and before inputting of the next memory clock signal 25 following the contention-bearing memory clock signal 25.

Hence, despite contention between writing of pixel data in the GRAM 2 and reading of pixel data from the GRAM 2 to the latch circuit 3, the next memory clock signal 25 following the contention-bearing memory clock signal 25 will not contend against re-reading of pixel data representing one scanning line to the latch circuit 3. It is thus possible to read normally pixel data representing one scanning line from the GRAM 2 to the latch circuit 3 according to the second embodiment.

In the event that display data output from the GRAM 2 has a characteristic that even though the bits of the memory elements which form the GRAM 2 have been once set to the H-state, as the bits of the memory elements which form the GRAM 2 are set again to the L-state, the GRAM 2 can output the L-state as display data corresponding these bits during the memory update period, contention would occur usually when the normal-time data latch signal and the memory clock signal are input at the same time. Excluding this, it is possible to realize a video processing circuit which avoids a display error through similar processing to the above even in this case.

Although the foregoing has described that the GRAM 2 stores pixel data amounting to one screen displayed by the display panel 8 according to the second embodiment, this is not limiting. The GRAM 2 may store pixel data which is equivalent to plural screens displayed by the display panel.

Further, although the foregoing has described that the latch circuit 3 reads and stores pixel data equivalent to one scanning line on the display panel 8 from the GRAM 2 according to the second embodiment, this is not limiting. The latch circuit 3 may read and store pixel data equivalent to plural scanning lines from the GRAM 2.

The foregoing has described that at the stage that the delay circuit 7 delays the memory clock signal 25 thereby generating the display read control for host retry 26 and the data latch signal for host retry 27, the memory clock signal 25 is delayed considering the information indicative of the delay time stored in the delay time storage memory 91, namely, data which expresses the interval between the two memory clock signals 25 which are input one after another according to the second embodiment. In this case, in the presence of a variation of the cycle of the memory clock signal 25 to the GRAM 2, based on information regarding the cycle of the memory clock signal 25 to the GRAM 2, the information indicative of the delay time stored in the delay time storage memory 91 may be appropriately updated in line with the varying cycle of the memory clock signal 25 to the GRAM 2, for the purpose of adjusting the delay time in a variable manner. This makes it possible to realize a video processing circuit which remains free from a display error even despite a variation of the cycle of the memory clock signal 25 to the GRAM 2.

Third Embodiment

The third embodiment will now be described.

According to the first embodiment and the second embodiment, the memory clock signal 12 changes to the H (High)-state at most once while the display read control signal 9 is in the memory update period. In other words, while the foregoing has described the first embodiment and the second embodiment as an example that the cycle of the memory clock signal 12 is longer than the memory update period of the display read control signal 9, this is not limiting.

That is, the third embodiment is directed to an example that the memory clock signal 12 changes to the H (High)-state twice or more frequently while the display read control signal 9 is in the memory update period.

The structure according to the third embodiment is similar to those according to the first embodiment and the second embodiment, and therefore will not be described.

An operation according to the third embodiment will now be described.

Figure 9:
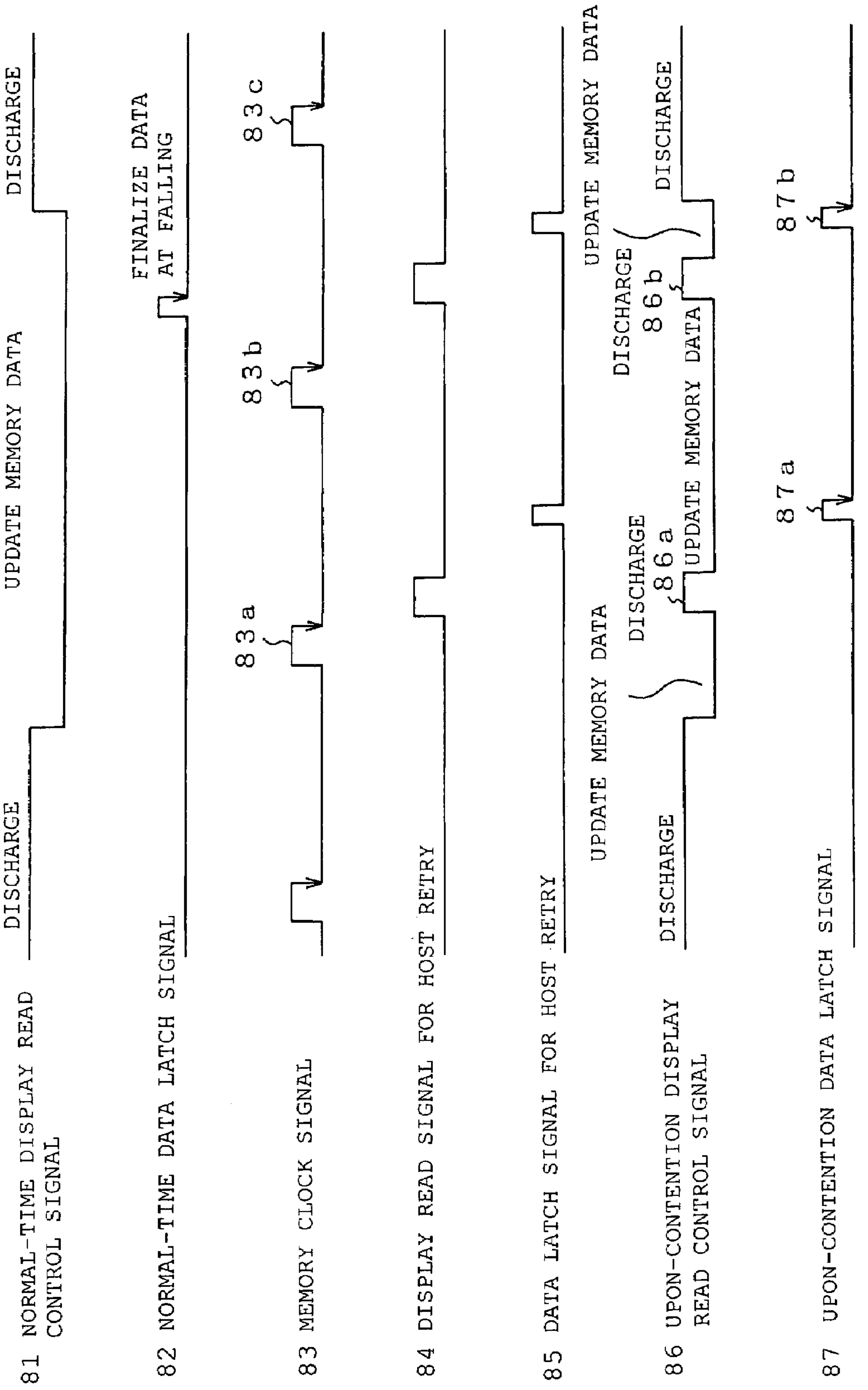
FIG. 9 is a timing chart of various types of drive signals and a control signal to a video processing circuit according to a third embodiments of the present invention.

FIG. 9 is a timing chart of various types of drive signals and a control signal to a video processing circuit 1, in a situation that the cycle of the memory clock signal 12 is shorter than the memory update period of the display read control signal 9 and the memory clock signal 12 changes to the H (High)-state twice or more times while the display read control signal 9 is in the memory update period.

In the timing chart in FIG. 9, the display read control signal 9 shown in FIG. 1 is shown as a normal-time display read control signal 81, the data latch signal 10 shown in FIG. 1 is shown as a normal-time data latch signal 82, the memory clock signal 12 shown in FIG. 1 is shown as a memory clock signal 83, the display read control signal for host retry 9*a* generated by the delay circuit 7 upon occurrence of contention is shown as a display read signal for host retry 84, and the data latch signal for host retry 10*a* generated by the delay circuit 7 upon occurrence of contention is shown as a data latch signal for host retry 85. Further, in FIG. 9, the display read control signal 9*b* output from the OR circuit 6 is shown as an upon-contention display read control signal 86, and the data latch signal 10*b* output from the OR circuit 5 is shown as an upon-contention data latch signal 87.

In short, the OR circuit 6 outputs, as the upon-contention display read control signal 86, a signal which is OR of the display read control signal 9 and the display read control signal for host retry 9*a* which is output from the delay circuit 7. Meanwhile, the OR circuit 5 outputs, as the upon-contention data latch signal 87, a signal which is OR of the data latch signal 10 and the data latch signal for host retry 10*a* which is output from the delay circuit 7.

In the timing chart in FIG. 9, the memory clock signal 83 is input twice while the normal-time display read control signal 81 is in the L-state, that is, during the memory update period.

Further, pixels for pixel data which is written in the GRAM 2 at falling of the memory clock signal 83 after inputting of the memory clock signal 83 are among those pixels which are for pixel data representing a horizontal scanning line which is finalized at falling of the normal-time data latch signal 82 after inputting of the normal-time data latch signal 82. In short, the latch circuit 3 reads the pixel data corresponding to the same pixels as those which correspond to the pixel data which is written in the GRAM 2.

This gives rise to contention between writing in the GRAM 2 and reading from the GRAM 2 to the latch circuit 3, as in the first embodiment and the second embodiment.

Upon occurrence of this, the delay circuit 7 of the control unit 4 receives the memory clock signal 12 and delays the memory clock signal 12 by a predetermined time, generates the display read control for host retry 84 and the data latch signal for host retry 85, and outputs these respectively to the OR circuit 6 and the OR circuit 5.

As the upon-contention display read control signal 86, the OR circuit 5 outputs to the latch circuit 3 a signal which is OR of the normal-time display read control signal 81 and the display read control for host retry 84.

As the upon-contention data latch signal 87, the OR circuit 6 outputs to the latch circuit 3 a signal which is OR of the normal-time data latch signal 82 and the data latch signal for host retry 85.

As a result, the upon-contention display read control signal 86 rises as denoted at 86*a* between 83*a* and 83*b* at which the memory clock signal 83 is in the H-state while the normal-time display read control signal 81 is in the memory update period, and rises as denoted at 86*b* between 83*b*, at which the memory clock signal 83 is in the H-state, and a point at which the normal-time display read control signal 81 starts the discharge period. Thus, the upon-contention display read control signal 86 rises twice as denoted at 86*a* and 86*b* while the normal-time display read control signal 81 is in the memory update period. Meanwhile, the upon-contention data latch signal 87 rises as denoted at 87*a* between 86*a* at which the upon-contention display read control signal 86 is in the H-state and 83*b* at which the memory clock signal 83 is in the H-state, and rises as denoted at 87*b* after 86*b* at which the upon-contention display read control signal 86 is in the H-state and while the normal-time display read control signal 81 is in the memory update period. In other words, the upon-contention data latch signal 87 rises twice after 86*a* and 86*b*, at which the upon-contention display read control signal is in the H-state, while the normal-time display read control signal 81 is in the memory update period. Hence, the latch circuit 3 sets the respective bits of the memory elements forming the latch circuit 3 to the L-state twice, in accordance with the upon-contention display read control signal 86. After the upon-contention display read control signal 86 has fallen to the L-state from the H-state, the latch circuit 3 updates data at the respective bits, and when the upon-contention data latch signal 87 falls to the L-state from the H-state, the latch circuit 3 finalizes the data at the respective bits.

In the case of contention between writing of pixel data in the GRAM 2 and reading of pixel data representing one scanning line from the GRAM 2 to the latch circuit 3, the control unit 4 delays the discharge period, the memory update period and the timing of finalizing data by a predetermined time, starting at the memory clock signal 83 at which the contention has occurred, as denoted at the upon-contention display read control signal 86 and the upon-contention data latch signal 87. Under the control of the control unit 4, the new discharge period and the new memory update period start and feeding of the new upon-contention data latch signal 87 to the latch circuit 3 ends before the GRAM 2 receives the next memory clock signal 83 following the contention-bearing memory clock signal 83. In the third embodiment, this control is exercised the number of times that the memory clock signal 83 becomes the H-state while the normal-time display read control signal 81 is in the memory update period.

Hence, despite contention between writing of pixel data in the GRAM 2 and reading of pixel data from the GRAM 2 to the latch circuit 3, the next memory clock signal 83 following the contention-bearing memory clock signal 83 will not contend against re-reading of pixel data representing one scanning line to the latch circuit 3. It is thus possible to read normally pixel data representing one scanning line from the GRAM 2 to the latch circuit 3 according to the third embodiment.

In this manner, even when the memory clock signal 83 becomes the H-state twice or more while the normal-time display read control signal 81 is in the memory update period, it is possible to avoid contention as the latch circuit 3 executes re-reading twice or more times, as in the first embodiment and the second embodiment.

POSSIBILITY OF INDUSTRIAL USE

As described clearly above, the present invention provides a video processing circuit which is free from a display error even despite contention between writing of pixel data in the GRAM and reading of pixel data representing a scanning line including pixels corresponding to the pixel data above, a control method for such a video processing circuit, and an integrated circuit.

The invention claimed is:

1. A video signal processing circuit, comprising:

a GRAM which stores pixel data, which is data corresponding to pixels of a display screen, at least in the amount equivalent to said display screen, said pixel data being written in said GRAM in synchronization to a memory clock signal;

a latch circuit which reads and stores pixel data corresponding to pixels representing a scanning line of said display screen from said GRAM; and a control unit, wherein said pixel data corresponding to said pixels representing said scanning line stored in said latch circuit is displayed on said display screen, in the case of contention between writing of said pixel data in said GRAM and reading of said pixel data corresponding to said pixels representing said scanning line to said latch circuit from said GRAM, said control unit delays for a predetermined delay time reading of said pixel data corresponding to said pixels representing said scanning line and controls so as to perform reading of said pixel data corresponding to said pixels representing said scanning line to said latch circuit from said GRAM once again, and said control unit comprises a delay unit which delays and inputs a display read control signal and a data latch signal for said predetermined delay time during a period which is after a point at which said memory clock signal corresponding to writing of said pixel data in said GRAM is supplied, said writing accompanying said contention, but which is before supplying of the next memory clock signal following said memory clock signal so that said latch circuit reads pixel data corresponding to pixels representing said scanning line.

2. The video signal processing circuit of claim 1, wherein said predetermined delay time can be adjusted in a variable manner.

3. The video signal processing circuit of claim 1, wherein said control unit comprises a monitoring unit which monitors whether writing of said pixel data in said GRAM contends against reading of said pixel data corresponding to said pixels representing said scanning line to said latch circuit from said GRAM.

4. The video signal processing circuit of claim 3, wherein said control unit comprises a delay unit which delays reading of said pixel data corresponding to said pixels representing said scanning line based on a monitoring result obtained by said monitoring unit and controls so as to perform reading of said pixel data corresponding to said pixels representing said scanning line to said latch circuit from said GRAM once again.

5. A video signal processing circuit, comprising:

a GRAM which stores pixel data, which is data corresponding to pixels of a display screen, at least in the amount equivalent to said display screen, said pixel data being written in said GRAM in synchronization to a memory clock signal;

a latch circuit which reads and stores pixel data corresponding to pixels representing a scanning line of said display screen from said GRAM; and a control unit, wherein said pixel data corresponding to said pixels representing said scanning line stored in said latch circuit is displayed on said display screen, in the case of contention between writing of said pixel data in said GRAM and reading of said pixel data corresponding to said pixels representing said scanning line to said latch circuit from said GRAM, said control unit delays for a predetermined delay time reading of said pixel data corresponding to said pixels representing said scanning line and controls so as to perform reading of said pixel data corresponding to said pixels representing said scanning line to said latch circuit from said GRAM once again, and when writing of said pixel data in said GRAM is executed plural times during a contention-free memory update period in which said pixel data corresponding to said pixels representing said scanning line are read to said latch circuit from said GRAM said control unit upon occurrence of said contention delays reading of said pixel data corresponding to said pixels representing said scanning line between a period of writing said pixel data and a period of writing next pixel data, and controls so as to perform reading of said pixel data corresponding to said pixels representing said scanning line to said latch circuit from said GRAM again plural times during said contention-free memory update period.

* * * * *